US007201657B2

(12) United States Patent
Baerlocher et al.

(10) Patent No.: US 7,201,657 B2
(45) Date of Patent: Apr. 10, 2007

(54) GAMING DEVICE HAVING A GAME WITH DECREASING PROBABILITIES OF SUCCESS

(75) Inventors: Anthony J. Baerlocher, Reno, NV (US); Bayard S. Webb, Sparks, NV (US)

(73) Assignee: IGT, Reno, NV (US)

( * ) Notice: Subject to any disclaimer, the term of this patent is extended or adjusted under 35 U.S.C. 154(b) by 754 days.

(21) Appl. No.: 10/238,237

(22) Filed: Sep. 10, 2002

(65) Prior Publication Data

US 2003/0008705 A1 Jan. 9, 2003

Related U.S. Application Data

(63) Continuation-in-part of application No. 10/114,837, filed on Apr. 2, 2002, now Pat. No. 6,780,110, which is a continuation of application No. 09/628,144, filed on Jul. 28, 2000, now Pat. No. 6,406,369.

(51) Int. Cl.
*A63F 13/00* (2006.01)

(52) U.S. Cl. .......................... 463/20; 463/16; 273/139

(58) Field of Classification Search ................ 463/6–7, 463/16–22, 25–27, 30, 40–42; 273/138.1, 273/138.2, 139, 143 R
See application file for complete search history.

(56) References Cited

U.S. PATENT DOCUMENTS 4,582,324 A 4/1986 Koza et al.
4,695,053 A 9/1987 Vazquez, Jr. et al.
5,067,712 A 11/1991 Georgilas
5,092,598 A 3/1992 Kamille
5,205,555 A 4/1993 Humano
5,342,047 A 8/1994 Heidel et al.
5,407,200 A 4/1995 Zalabak
5,449,173 A 9/1995 Thomas et al.
5,501,455 A 3/1996 Hirata et al.
5,536,016 A 7/1996 Thompson
5,647,798 A 7/1997 Falciglia
5,664,998 A 9/1997 Seelig et al.
5,766,074 A 6/1998 Cannon et al.
5,769,716 A 6/1998 Saffari et al.
5,772,509 A 6/1998 Weiss
5,788,573 A 8/1998 Baerlocher et al.

(Continued)

FOREIGN PATENT DOCUMENTS

EP 0 874 337 A1 10/1998

(Continued)

OTHER PUBLICATIONS

Racing 7's written by IGT, published prior to 2000.

(Continued)

*Primary Examiner*—John M. Hotaling, II
*Assistant Examiner*—Alex F R P Rada, II
(74) *Attorney, Agent, or Firm*—Bell, Boyd & Lloyd LLP

(57) ABSTRACT

A gaming device having a bonus scheme wherein the success or failure of a current selection directly affects the player's chances for success in a later selection. The probabilities of success are related to the number of previous successful attempts by the player.

35 Claims, 11 Drawing Sheets

U.S. PATENT DOCUMENTS

| | | | |
|---|---|---|---|
| 5,823,872 A | 10/1998 | Prather et al. | |
| 5,823,873 A | 10/1998 | Moody | |
| 5,873,781 A | 2/1999 | Keane | |
| 5,910,046 A | 6/1999 | Wada et al. | |
| 5,927,714 A | 7/1999 | Kaplan | |
| 5,931,467 A * | 8/1999 | Kamille | 273/139 |
| 5,947,820 A | 9/1999 | Morro et al. | |
| 5,964,463 A | 10/1999 | Moore, Jr. | |
| 5,967,894 A | 10/1999 | Kinoshita et al. | |
| 5,976,015 A | 11/1999 | Seelig et al. | |
| 5,980,384 A | 11/1999 | Barrie | |
| 5,984,781 A | 11/1999 | Sunaga | |
| 5,996,997 A | 12/1999 | Kamille | |
| 5,997,400 A | 12/1999 | Seelig et al. | |
| 5,997,401 A | 12/1999 | Crawford | |
| 6,001,016 A * | 12/1999 | Walker et al. | 463/42 |
| 6,015,346 A | 1/2000 | Bennett | |
| D421,068 S | 2/2000 | Yamaguchi | |
| 6,019,369 A | 2/2000 | Nakaga et al. | |
| 6,033,307 A | 3/2000 | Vancura | |
| 6,056,642 A | 5/2000 | Bennett | |
| 6,059,289 A | 5/2000 | Vancura | |
| 6,062,980 A | 5/2000 | Luciano | |
| 6,071,192 A | 6/2000 | Weiss | |
| 6,089,976 A | 7/2000 | Schneider et al. | |
| 6,089,977 A | 7/2000 | Bennett | |
| 6,102,798 A | 8/2000 | Bennett | |
| 6,117,007 A | 9/2000 | Matsuyama et al. | |
| 6,117,008 A | 9/2000 | Machiguchi | |
| 6,120,031 A | 9/2000 | Adams | |
| 6,126,542 A | 10/2000 | Fier | |
| 6,126,547 A | 10/2000 | Ishimoto | |
| 6,135,884 A | 10/2000 | Hedrick et al. | |
| 6,135,885 A | 10/2000 | Lermusiaux | |
| 6,142,874 A | 11/2000 | Kodachi et al. | |
| 6,155,925 A | 12/2000 | Giobbi et al. | |
| 6,159,095 A | 12/2000 | Frohm et al. | |
| 6,159,096 A | 12/2000 | Yoseloff | |
| 6,159,097 A | 12/2000 | Gura | |
| 6,159,098 A | 12/2000 | Slomiany et al. | |
| 6,162,121 A | 12/2000 | Morro et al. | |
| 6,164,652 A | 12/2000 | Lauretta et al. | |
| 6,168,520 B1 | 1/2001 | Baerlocher et al. | |
| 6,173,955 B1 | 1/2001 | Perrie et al. | |
| 6,174,235 B1 | 1/2001 | Walker et al. | |
| 6,190,254 B1 | 2/2001 | Bennett | |
| 6,190,255 B1 | 2/2001 | Thomas et al. | |
| 6,203,429 B1 | 3/2001 | Demar et al. | |
| 6,231,442 B1 | 5/2001 | Mayeroff | |
| 6,231,445 B1 | 5/2001 | Acres | |
| 6,261,177 B1 | 7/2001 | Bennett | |
| 6,270,412 B1 | 8/2001 | Crawford et al. | |
| 6,290,600 B1 | 9/2001 | Glasson | |
| 6,296,568 B1 | 10/2001 | Tracy | |
| 6,302,790 B1 | 10/2001 | Bossard | |
| 6,309,300 B1 | 10/2001 | Glavich | |
| 6,315,664 B1 | 11/2001 | Baerlocher et al. | |
| 6,319,124 B1 | 11/2001 | Baerlocher et al. | |
| 6,336,860 B1 | 1/2002 | Webb | |
| 6,346,043 B1 | 2/2002 | Colin et al. | |
| 6,347,996 B1 * | 2/2002 | Gilmore et al. | 463/17 |
| 6,375,187 B1 | 4/2002 | Baerlocher | |
| 6,413,161 B1 | 7/2002 | Baerlocher et al. | |
| 6,439,995 B1 | 8/2002 | Hughs-Baird et al. | |
| 6,443,837 B1 | 9/2002 | Jaffe et al. | |
| 6,461,241 B1 | 10/2002 | Webb et al. | |
| 6,464,582 B1 | 10/2002 | Baerlocher et al. | |
| 6,485,367 B1 | 11/2002 | Joshi | |
| 6,494,785 B1 | 12/2002 | Gerrard et al. | |
| 6,506,118 B1 | 1/2003 | Baerlocher et al. | |
| 6,514,141 B1 | 2/2003 | Kaminkow et al. | |
| 6,569,015 B1 | 5/2003 | Baerlocher et al. | |
| 6,575,830 B2 | 6/2003 | Baerlocher et al. | |
| 6,585,591 B1 | 7/2003 | Baerlocher et al. | |
| 6,595,854 B2 | 7/2003 | Hughs-Baird et al. | |
| 6,599,192 B1 | 7/2003 | Baerlocher et al. | |
| 6,632,141 B2 | 10/2003 | Webb et al. | |
| 6,634,943 B1 | 10/2003 | Baerlocher | |
| 6,733,386 B2 | 5/2004 | Cuddy et al. | |
| 6,863,606 B1 * | 3/2005 | Berg et al. | 463/16 |
| 2002/0025844 A1 | 2/2002 | Casey et al. | |
| 2002/0045475 A1 | 4/2002 | Glavich et al. | |
| 2002/0049084 A1 | 4/2002 | Hughs-Baird et al. | |
| 2002/0072402 A1 | 6/2002 | Baerlocher | |
| 2002/0107068 A1 | 8/2002 | Baerlocher et al. | |
| 2002/0142822 A1 | 10/2002 | Baerlocher et al. | |
| 2002/0151350 A1 | 10/2002 | Baerlocher et al. | |
| 2002/0155883 A1 | 10/2002 | Baerlocher | |
| 2003/0013514 A1 | 1/2003 | Cregan et al. | |
| 2003/0040355 A1 | 2/2003 | Baerlocher | |
| 2003/0045344 A1 | 3/2003 | Webb et al. | |
| 2003/0045348 A1 | 3/2003 | Palmer et al. | |
| 2003/0060266 A1 | 3/2003 | Baerlocher | |
| 2003/0064795 A1 | 4/2003 | Baerlocher et al. | |

FOREIGN PATENT DOCUMENTS

| | | |
|---|---|---|
| EP | 0 984 407 A3 | 8/1999 |
| EP | 0 945 837 A2 | 9/1999 |
| EP | 0 984 409 A2 | 3/2000 |
| GB | 2 092 797 | 8/1982 |
| GB | 2 144 644 | 3/1985 |
| WO | WO 9814251 | 4/1998 |

OTHER PUBLICATIONS

Top Dollar Brochure written by IGT, published in 1998.
Top Gear Brochure written by Aristocrat Leisure Industries Pty., Ltd., published in 1995.
American Thunder Screen Shots written by IGT, published in 1998.
Polly & Roger Brochure written by VLC, Inc., published in 2000.
Fortune Cookie written by IGT, published in 2000.
Double Up—Poker Game Description written by IGT, published in 2000.
Odyssey Article written by Silicon Gaming, published in Feb. 2001.
Star Spangled Keno Gaming Machine Description written by Silicon Gaming, published in 2001.
Elvis Brochure written by IGT, published in 1999.
Deep Pockets Advertisement, written by IGT, published in Mar. 2002.
Family Feud website, printed from www.timvp.com.famfeud.html printed on Dec. 17, 2004, available prior to 2000.
Family Feud History website, printed from familyfeud.tv/history.html on Dec. 17, 2004, available prior to 2000.
The Frog Prince Advertisement, written by IGT, published in 2001.
Regis Cash Club Advertisement, written by IGT, published in Jan. 2002.
Big Bang Piggy Bankin' Advertisement written by WMS, published prior to 2000.

* cited by examiner

GAMING DEVICE HAVING A GAME WITH DECREASING PROBABILITIES OF SUCCESS

PRIORITY CLAIM

This application is a continuation-in-part and claims the benefit of U.S. patent application Ser. No. 10/114,837, filed Apr. 2, 2002 now U.S. Pat. No. 6,780,110 which is a continuation application and claims the benefit of U.S. patent application Ser. No. 09/628,144, filed Jul. 28, 2000, now U.S. Pat. No. 6,406,369 B1.

CROSS-REFERENCE TO RELATED APPLICATIONS

This application is related to the following commonly-owned co-pending patent applications: “GAMING DEVICE WITH BONUS SCHEME PROVIDING AWARDS ASSOCIATED WITH MOVEMENTS ALONG PATH,” Ser. No. 09/583,429, now abandoned; “GAMING DEVICE HAVING A METHOD FOR RANDOMLY GENERATING A BONUS ROUND OUTCOME,” Ser. No. 09/679,251, now U.S. Pat. No. 6,569,016; “GAMING DEVICE HAVING A BONUS ROUND WITH MULTIPLE RANDOM AWARD GENERATION AND MULTIPLE RETURN/RISK SCENARIOS,” Ser. No. 09/678,989, now U.S. Pat. No. 6,776,711; “GAMING DEVICE HAVING AN INDICATOR SELECTION WITH PROBABILITY-BASED OUTCOME BONUS SCHEME ,” Ser. No. 09/981,163, now U.S. Pat. No. 6,783,457; “GAMING DEVICE HAVING AN INDICATOR SELECTION WITH PROBABILITY-BASED OUTCOME,” Ser. No. 09/990,693, now U.S. Pat. No. 6,676,516; “GAMING DEVICE HAVING A MULTIPLE ROUND GAME WHERE SUCCESS IN ONE ROUND DETERMINES THE PROBABILITIES OF SUCCESS IN ANOTHER ROUND,” Ser. No. 10/659,629, “GAMING DEVICE HAVING AN INDICATOR SELECTION WITH PROBABILITY-BASED OUTCOME,” Ser. No. 10/734,307, GAMING DEVICE HAVING A BONUS ROUND WITH MULTIPLE RANDOM AWARD GENERATION AND MULTIPLE RETURN/RISK SCENARIOS,” Ser. No. 10/865,713, and “GAMING DEVICE HAVING A COMPETITION BONUS SCHEME,” Ser. No. 10/923,203.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with a bonus scheme wherein the player takes part in a competition, the success of which determines the player’s bonus award.

BACKGROUND OF THE INVENTION

Gaming machines currently exist with bonus schemes in which a player has one or more opportunities to choose bonus awards that are initially masked from a group of symbols arranged in a pattern displayed to the player. When the player chooses a masked symbol from the pattern, the bonus scheme removes the mask and either awards the player with a bonus value or terminates the bonus round with a bonus terminator. The outcome depends upon whether the player selects an award or a terminator. The controller of the gaming machine randomly places a predetermined number of bonus awards and bonus terminators in the pattern at the beginning of the bonus round and maintains the positioning until the bonus round terminates.

When the player selects a symbol that awards a bonus value, the player receives bonus credits, the bonus scheme typically displays a message that the player may continue and enables the player to select another symbol. The player then selects another masked symbol, and the process continues until the player selects a bonus round terminator. European Patent Application No. EP 0 945 837 A2 filed on Mar. 18, 1999 and assigned on its face to WMS Gaming, Inc. discloses a bonus scheme of this type.

In the above type of scheme, a prior selection does not affect the current selection except to the extent that one less selection possibility exists. The bonus scheme may also end quite quickly if the player selects a bonus terminator early in the bonus round. While the European Patent Application No. EP 0 945 837 discloses a “bonus resource” that a player may obtain during the base game of the gaming device, which the player can thereafter apply during the bonus round, the “bonus resource” may only extend the life of the bonus round momentarily before the player again selects a bonus terminator. The application discloses that the “bonus resource” is not certain to occur in the base game, so that the player may not have a bonus resource in the bonus round. Finally, the player blindly selects masked symbols until selecting the bonus terminator, which is immediately displayed. The player sees only the result, an award or a terminator.

Bonus schemes provide gaming manufacturers with the opportunity to add enjoyment and excitement to that which is already expected from the base game. Excitement and enjoyment increases when the level of interaction between the bonus scheme increases and also when the bonus round remains compelling for an extended period of time. It is therefore desirable to create a bonus scheme in which a current selection relates to or impacts a later selection. It is also desirable to provide a bonus round that remains compelling for an extended period of time even if the player does not ultimately fare well in the bonus round. Finally, a bonus scheme can increase excitement and enjoyment by depicting the success or failure during the bonus scheme, not merely the end result.

SUMMARY OF THE INVENTION

The apparatus and method of the present invention provides a gaming device having a bonus scheme wherein the player takes part in a contest, competition, event or situation, the success of which determines the player’s bonus award. The gaming device provides the player with a predetermined number of chances to advance to a higher bonus score. The game preferably provides the same number of chances regardless of the player’s performance. The outcome of each player selection directly affects the player’s chances for success in a later selection and the player’s chances for obtaining the highest bonus award possible. The gaming device also displays, in accordance with the theme of the competition, how the player fairs in the competition.

In general, when the reels of the base game of the present invention contain symbols that trigger the bonus round, the game initializes and displays a competitive environment, contest, event or situation. The preferred embodiment is an automobile racetrack with nine cars in nine positions, first to ninth, in which a player is initially in the position of ninth place. The race begins and runs for eight laps. In each lap, the player (who acts as the driver) has one opportunity to pass the preceding car by choosing either to pass to the left or to the right of the preceding car. The gaming device stores a database having a success probability for each lap, wherein the probability of success preferably decreases as the player advances.

When the player selects to pass left or pass right, the game invokes the database and displays a dynamic video computer generated, animated or combined audio-visual enactment of a driver attempting to pass to the chosen side. The display shows a successful pass or a failed attempt. The player proceeds in this manner to pass as many cars as possible in eight laps, with the odds of passing preferably decreasing as the player passes each preceding car or competitor. The player's position at the end of eight laps determines the bonus award, wherein the closer the player is to first place, the higher the bonus award.

The game is preferably displayed on a video monitor, and the video monitor preferably contains a touch screen for the player to input signals, such as whether the player wishes to pass to the left or to the right of the preceding car. The game consists of a plurality of screens shown on the video monitor. An initial screen displays the gaming arena which is preferably a racetrack. The screen shows a leader board having a plurality of positions, a race car in each position (one of which is the player), and a multiplier for each position. Preferably, the multiplier increases as the positions advance from ninth to first.

The initial screen also contains at least one and preferably two or more action activators. When the player selects one of the activators, the game switches screens and displays an audio-visual enactment of the competition using the player's selection. The enactment shows the player (or driver representing the player) attempting to pass the preceding car on the left or on the right, whichever the player has selected, and ultimately shows a successful or unsuccessful pass attempt. After the enactment, the game returns the player to the initial screen, wherein the player again selects one of the activators. If the previous attempt has been successful, the player attempts to pass a new car. If not, the player attempts to pass the same car. If the player is successful, the player advances on the leader board.

The implementor of the gaming device can set the multipliers on the leader board to increase linearly or non-linearly in accordance with the game theme and to enhance player excitement and enjoyment. Also, the implementor ordinarily sets the probabilities of advancement from one position to the next to decrease in accordance with the increase of the multipliers. As the multipliers increase, the probabilities of success decrease. When the player fails to advance and returns to the initial screen to make another attempt, the probability of advancement preferably stays the same but alternatively may increase or decrease.

The player continues to attempt to advance by selecting to pass left or pass right until the player makes eight selections, at which time the bonus round ends. In an alternative embodiment, the game could allow more selections than there are positions in which case the bonus round could end when the player reaches the most valuable position on the leader board. At the end of the bonus round, the game retrieves a bonus multiplier from a database in memory that corresponds to the player's final position on the leader board. The game's processor multiplies the multiplier by the player's current base game bet and displays the new total of base game credits. The bonus scheme preferably contains an additional credit display on the initial screen of the touch screen.

In one alternative embodiment, the present invention provides a game that randomly provides awards to a player when the player receives a successful outcome. This embodiment is different than the other embodiments of the game, wherein the player progresses successively from award position to award position, wherein the player exchanges a lower award for a higher award. In each embodiment, the player's probability of success decreases in an attempt following a successful attempt. Further, in each embodiment, the player's probability of success stays the same or increases after the player unsuccessfully makes an attempt at an award. The primary difference is that when the player does achieve a successful outcome in this alternative embodiment, the gaming device can provide any of a possible set of awards, not just the next highest award. The gaming device in this embodiment also provides a number of different ways that the game ends, including providing a total number of picks, providing a limit of unsuccessful outcomes and providing a limited number of successful outcomes.

It is therefore an object of the present invention to provide a gaming device with a competitive bonus scheme.

Another object of the present invention is to provide a gaming device with a bonus round which remains compelling for an extended period of time even if the player does not ultimately fare well in the bonus round.

Yet another object of the present invention is to provide a gaming device with a bonus round which illustrates an audiovisual depiction of the success or failure of the bonus scheme, not merely the end result.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
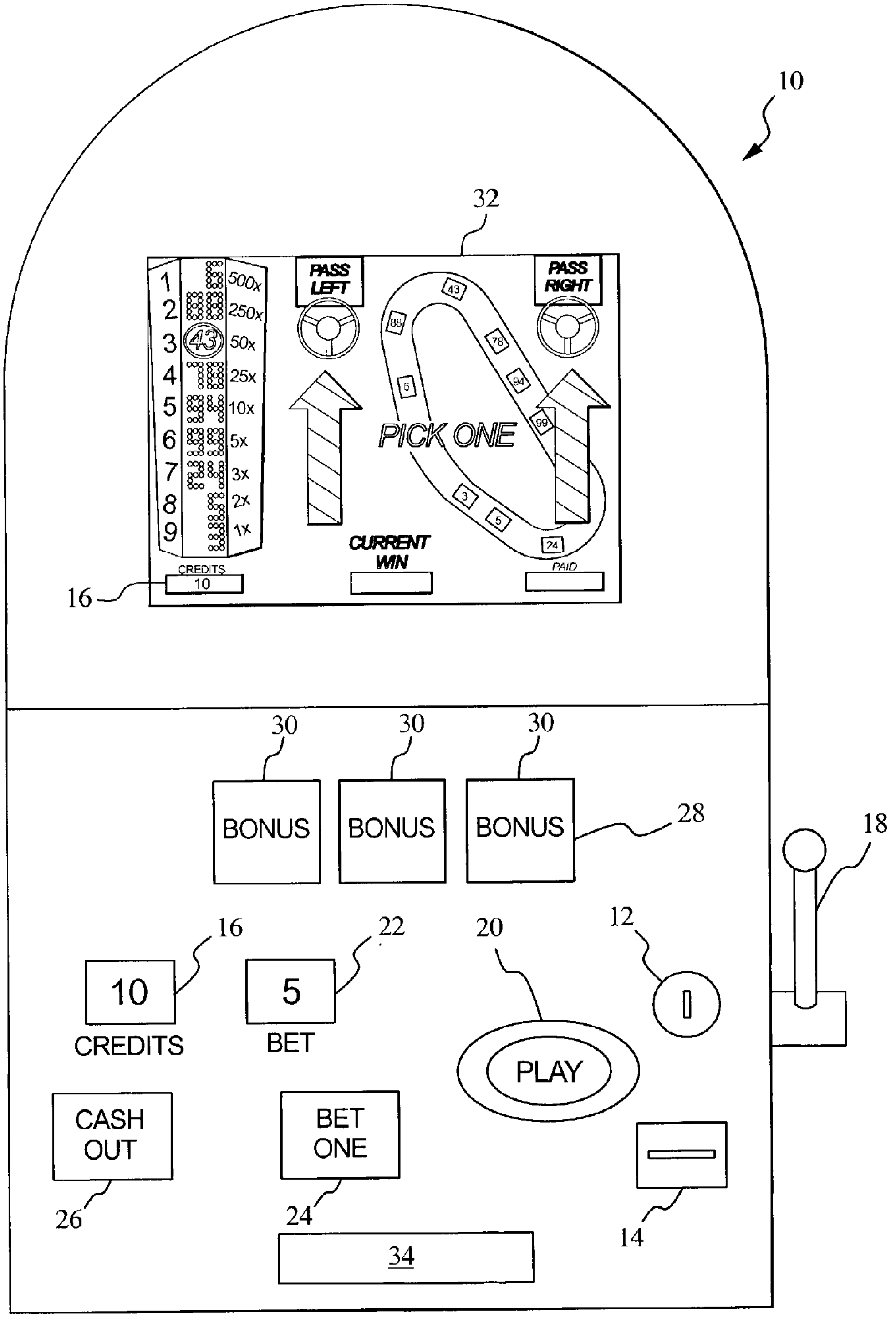
FIG. 1 is a front elevational view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus scheme of the present invention. The symbols and indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism which starts the game.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 at video monitor 32 instead of at display window 28.

A player may cash out and thereby receive a number of coins corresponding to the number of remaining credits by pushing a cash out button 26. When the player cashes out, the player receives the coins in a coin payout tray 34. The gaming device 10 may employ other payout mechanisms such as credit slips redeemable by a cashier or electronically recordable cards which keep track of the player's credits.

With respect to electronics, gaming device 10 preferably includes the electronic configuration generally illustrated in FIG. 2, including a processor 36, a memory device 38 for storing program code or other data, a video monitor 32 or other display device (i.e., a liquid crystal display) and at least one input device as indicated by block 40 such as the arm 18, play button 20, the bet one button 24, and the cash out button 26. The processor 36 is preferably a microprocessor or microcontroller-based platform which is capable of displaying images, symbols and other indicia such as images of people, characters, places, things and faces of cards. The memory device 38 can include random access memory (RAM) 42 for storing event data or other data generated or used during a particular game. The memory device 38 can also include read only memory (ROM) 44 for storing program code which controls the gaming device 10 so that it plays a particular game in accordance with applicable game rules and pay tables.

As illustrated in FIG. 2, the player can use input devices as generally indicated by block 40 to input signals into gaming device 10. However, it is preferable that a touch screen 46 and an associated touch screen controller 48 are used instead of the conventional video monitor 32. Touch screen 46 and touch screen controller 48 are connected to a video controller 50 and processor 36. A player can make decisions and input signals into the gaming device 10 by touching touch screen 46 at the appropriate locations. As further illustrated in FIG. 2, the processor 36 can be connected to coin slot 12 or bill acceptor 14. The processor 36 can be programmed to require a player to deposit a certain amount of money in order to start the game.

Figure 2A:
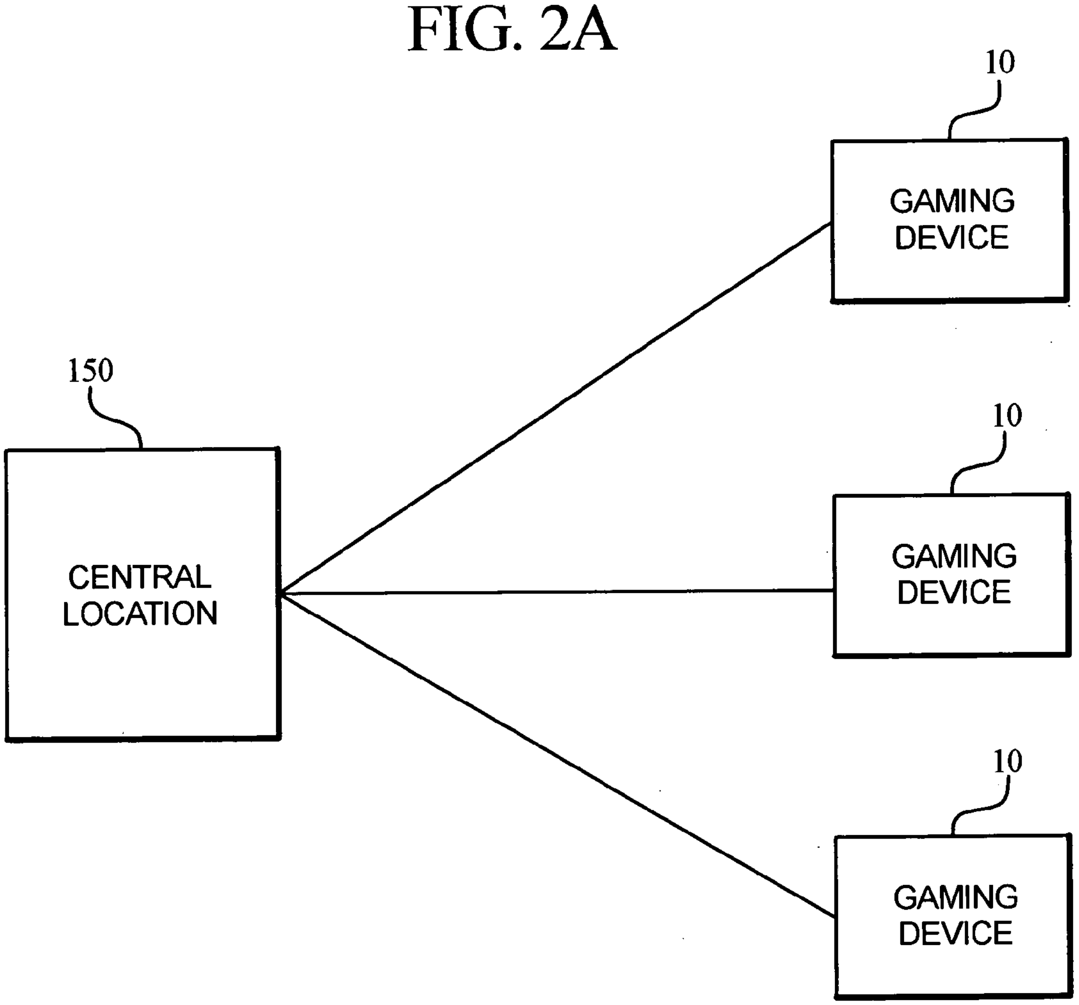
FIG. 2A is a schematic block diagram illustrating a plurality of gaming terminals in communication with a central location.

It should be appreciated that although a processor 36 and memory device 38 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 36 and memory device 38 preferably reside on each gaming device 10 unit, as illustrated in FIG. 2A, it is possible to provide some or all of their functions at a central location 150 such as a network server for communication to a playing station such as over a local area network (LAN), wide area network (WAN), Internet connection, microwave link, and the like. The processor 36 and memory device 38 are together generally referred to herein as a "computer."

With reference to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device 10 also includes a display device such as a video monitor 32 shown in FIG. 1. The display device visually displays images and produces sounds, enabling the player to play the bonus round. Preferably, the qualifying condition is a predetermined combination of indicia appearing on a plurality of reels 30. As illustrated in the three reel slot machine shown in FIG. 1, the qualifying condition could be the text "BONUS!" appearing in the same location on three adjacent reels.

Bonus Scheme

Figure 3:
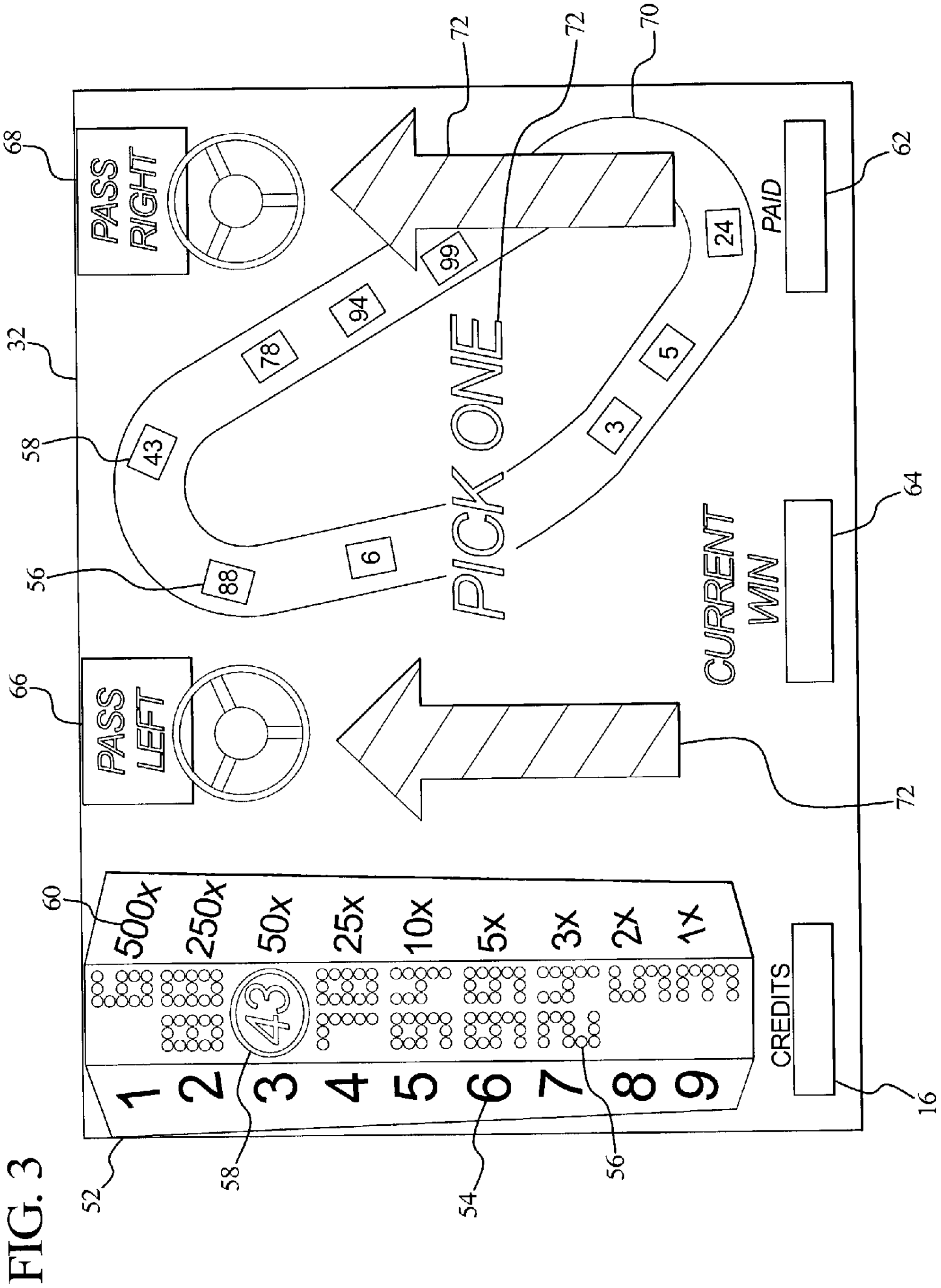
FIG. 3 is an enlarged view of the video monitor of the gaming device of the present invention shown in FIG. 1.

FIG. 3 is an enlargement of the video monitor 32 from FIG. 1, which contains a screen showing the preferred embodiment of the present invention. The preferred embodiment employs an automobile race, however, it should be appreciated that the scheme could employ any racing format such as a horse race or any other contest, competition, event or situation. The common elements in all of these preferred embodiments is that a first place, a plurality of intermediate positions and a last place exist. The present scheme could also tailor any competition such as a football game, a baseball game or a basketball game to fit the bonus scheme by providing, for example, a plurality of participants or teams ranked from first to last place.

The preferred embodiment includes a position, place or bonus award indicator such as a leader board 52 having a plurality positions generally indicated by consecutive ascending or descending numbers 54 that track a player's (driver's) progress. The preferred embodiment contains nine positions 54, however, the scheme contemplates any number of positions. Preferably, the scheme provides the player with a number of chances to advance to the most valuable position. In the preferred embodiment, the player begins in the last place and has eight chances to advance (i.e., one chance for each position). If the player advances in each of the eight chances, the player will be in first place and will win the largest bonus award or prize. Alternatively, the scheme could provide two or more chances to advance for any one of the positions. The present invention enhances player enjoyment and excitement by providing a relatively long bonus event in comparison to other bonus schemes. The game implementor chooses the number of positions and the number of chances to advance to maximize player excitement and enjoyment.

The chance for advancement preferably follows the game theme. In the preferred embodiment, a chance to advance takes place during one lap of a race track, wherein the chance includes one attempt to pass the race car ahead of the player/driver. In an alternative embodiment, the chance could include a plurality of opportunities to pass the preceding car. In another alternative embodiment, the chance could include a preset amount of time in which the player can pass the car ahead. In another, the scheme could provide the player with one or more chances to overtake a plurality of cars (thus advancing a plurality of positions 54 on the leader board 52) in one or more laps or in a preset amount of time.

The leader board 52 displays a plurality of competitors generally indicated by symbols such as numbers 56 who are competing with the player who is represented by a symbol such as a number 58 for the most valuable position. The positions are ranked in accordance with a series of multipliers generally indicated by number 60, which will ultimately provide the player's bonus. For each position 54, there exists a competitor number 56 or a player number 58 and a multiplier 60. Preferably, the multipliers advance from lowest to highest, as shown, in accordance with a game theme that has a last place, a plurality of intermediate positions and a first place. In the preferred embodiment, the driver in the last or ninth position 54, has the lowest multiplier 60, here a 1×, while the driver in the highest or first position 54, has the highest multiplier 60, here a 500×. At the end of the bonus round, the position of the player determines the player's bonus scheme award. Here, the player is shown driving car forty-three and has a 50× multiplier.

It should be appreciated that the multipliers can advance in a linear fashion such as 50×, 100×, 150×, 200×, 250×, 300×, 350×, 400×, and 450×, exponentially such as 2×, 4×, 8×, 16×, 32×, 64×, 128×, and 256×, or in any other non-linear fashion such as shown in the preferred embodiment as 1×, 2×, 3×, 5×, 10×, 25×, 50×, 250× and 500×. In the preferred embodiment, the distribution is flat in the beginning but peaks at the end. The implementor designates the bonus multiplier increments according to the game theme, the number of chances for advancement and according to a change in the probability of advancement between positions 54, as described below. Preferably, the scheme rewards the player for advancement by increasing the multipliers, however, the present invention contemplates placing "stumbling blocks" along the way wherein an advance multiplier does not have a higher value than does current multiplier.

The present scheme contemplates providing the player with one or more action activators herein referred to as action activator 66 and alternative action activator 68. Generally, the action activator 66 and the alternative action activator 68 provide the player with a choice or selection, wherein the player makes the choice or selection during the opportunity to advance. In the preferred embodiment, the bonus scheme provides the player the option to select the action activator 66 to pass left or to select the alternative action activator 68 to pass right. The present invention contemplates employing any suitable action that conforms to the game theme. Preferably, the action is outcome determinative. For example, in an embodiment where the player is a baseball pitcher, the player might be required to choose between throwing a fast ball or a curve ball.

When the player selects a choice of action, the processor makes a random determination based on a database of predetermined probabilities contained in the memory device 38 as to whether the player has made the right choice or not. If the player makes the right choice, the player advances to the next position and the probability for advancement preferably decreases. The database of probabilities in the memory of the computer preferably relates, albeit negatively, to the bonus multiplier increments. For example, if the bonus multipliers increment linearly as described above, then the probability of advancement preferably decreases linearly. If the bonus multipliers increment exponentially or otherwise non-linearly, then the probability of advancement preferably decreases exponentially or non-linearly.

In a linear example, if the multipliers advance; 50×, 100×, 150×, 200×, 250×, 300×, 350×, 400×and 450×, the probability of making the correct choice preferably decreases linearly, such as; 90%, 80%, 70%, 60%, 50%, 40%, 30% and 20% (note that there are nine positions and thus nine multipliers, but only eight advancement probabilities, one for each chance to advance). In a non-linear example, if the multipliers advance; 1×, 2×, 3×, 5×, 10×, 25×, 50×, 250×and 500×, the probability of making the correct choice preferably decreases non-linearly, such as 95%, 90%, 80%, 65%, 55%, 30%, 20% and 15%. It should be appreciated that the present invention could employ any suitable combination of probability sets and multiplier sets in accordance with a game theme or to enhance player enjoyment and excitement as desired by the implementor of the gaming device.

Figure 4:
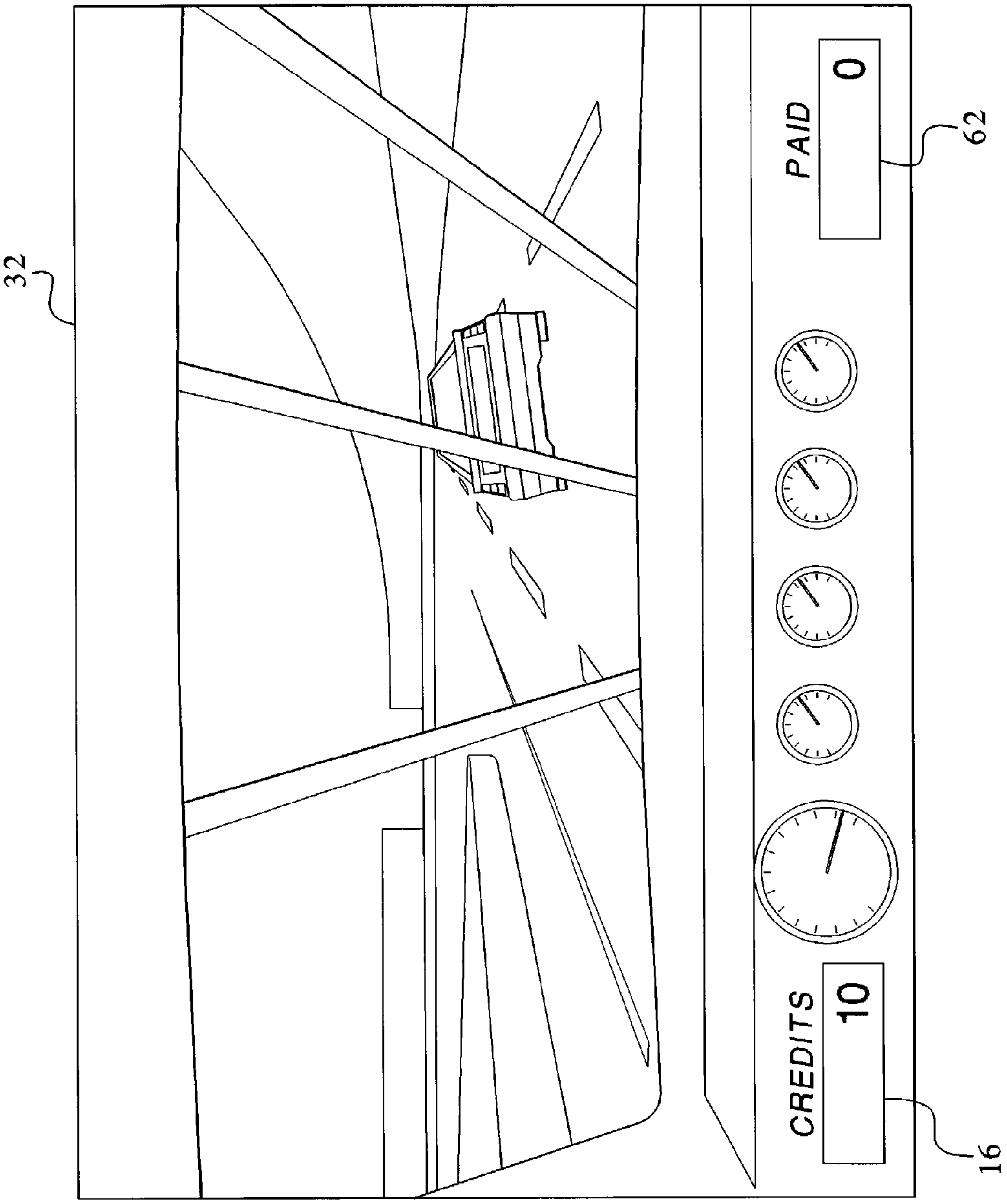
FIG. 4 is a single screen from a dynamic audio-visual display illustrating the responsive dynamic display element of the present invention.

The choice of either the action activator 66 or the alternative action activator 68 sets in motion a demonstration or display of the action that enhances player excitement and enjoyment. FIG. 4 is one image of the display of a dynamic, video, computer simulated, animated or combined audio-visual demonstration, shown on the video monitor 32, which displays whether the player has made the right choice and thus whether the player advances in the bonus round. Preferably, the demonstration follows the theme of the embodiment. In FIG. 4, the preferred embodiment illustrates a realistic auto racing scene from the viewpoint of a racecar driver (i.e., the player) who is in hot pursuit of a competitor immediately in front of the driver. It should be appreciated that the bonus scheme of the present invention could employ any suitable demonstration that is in accordance with an auto race. The demonstration is preferably dynamic, e.g., shows changes over time. The demonstration can be a video-clip from a motion picture, a dynamic computer generated or simulated image, an animation or any combination thereof.

The action is whether the player or driver will pass on the left or on the right of the preceding car. After the player selects whether to go left or right, the demonstration acts out the choice and shows the player's racecar attempting to or proceeding to pass on the left or the right. Ultimately, the demonstration reveals (by visual, audio or audio-visual signals) whether the player passes successfully and advances or whether the player is "cut-off" and stays in the current position. When the demonstration is finished, the player returns to the initial screen, which shows the leader board. If the bonus scheme no longer enables the player to have a chance to advance or if the player has achieved the most valuable position, the initial screen displays the player's final position and bonus award, and the bonus round ends.

If the player's pass attempt is successful and if another chance at advancement exists, the game advances the player to the next position of leader board 52 and enables the player to select to pass the next preceding car on the left or the right, for which the probability of success decreases. If the player's pass attempt is not successful and if another chance at advancement exists, the game enables the player to attempt to pass the same car as before on the left or the right, for which the probability of success stays the same. In an alternative embodiment, the game increases the probability of success at one or more positions 54 when the player fails to advance. This embodiment could, for example, increase the probability that the player will advance when the player fails to pass after two consecutive laps.

The present invention contemplates providing a position depiction 70, in accordance with the theme of the bonus scheme, that illustrates the relative position of the player number 58 and the plurality of competitor numbers 56. The position depiction 70 preferably involves an enactment of the contest, competition or event. The position depiction can be static or animated. In the present embodiment, the position depiction is an animated top plan view of a racetrack that displays a symbol for each competitor 56 and a symbol representing the player 58. Preferably, the symbols move along the racetrack in their current relative positions, but the display may show certain symbols gaining on the symbol ahead. When the player selects one of the action activators 66 and 68, and the bonus scheme displays the screen of FIG. 4 and determines whether the player advances, the position depiction 70 updates the position of the player's symbol if the player advances.

Referring to FIGS. 3 and 4, both screens of the video monitor 32 contain a second credit display 16 in close proximity to the bonus scheme so that the player may easily see the player's total credits while playing the bonus round. It should be appreciated that the credit display 16 is not necessary for the bonus scheme of the present invention.

Both screens also contain a paid display 62. The paid display 62 shows the number of credits from the bonus round that the game has added to the credit meter 16. The initial screen of FIG. 3 further contains a current win display 64. The current win display 64 shows the current win amount of the bonus round and updates itself each time the player advances to the next level.

Alternative Embodiment

In an alternative embodiment, the present scheme contemplates having any contest, competition, event or situation regardless of whether there exists a first place, a plurality of intermediate positions and a last place. In this embodiment, the player obtains a higher bonus award when a symbol representing the player succeeds in any aspect of a contest, competition, event or situation. For instance, in a basketball game, the invention contemplates advancing a player's bonus award for making a basket. The invention could allow the player to attempt a plurality of shots, for example in a 3-point shooting contest or a game of "h-o-r-s-e." The player preferably would not lose bonus awards for failing to succeed, however, the invention contemplates reducing the player's bonus in such a situation.

The probability of succeeding increases or decreases in accordance with the game theme. In the basketball example, the probability could decrease as the difficulty of the shot increases. The probabilities could increase incrementally as the contest proceeds, or the probabilities could decrease incrementally as the contest proceeds. In other contests, such as a card game, the probabilities could change randomly.

This embodiment contemplates displaying the bonus award in a suitable manner in accordance with the game theme. In the basketball example, the bonus scheme could display a bonus award indicator such as a scoreboard, wherein the player's bonus award is shown as the score. In a baseball game, the award could be the summation or multiplication of runs obtained in an inning. In a pool game, the bonus scheme could provide a counter that tallies the numbers on the pool balls that the player successfully shoots into a pocket.

The invention contemplates providing different aspects of one or more contests in a single bonus scheme. For example, the bonus scheme could simulate a decathlon, wherein the player obtains bonus awards based upon the player's place of finish in one or more of the decathlon events. This embodiment enhances player excitement and enjoyment by providing a bonus round that remains compelling for an extended period of time even if the player does not ultimately fare well in the bonus round.

The invention also shows the player a depiction of the success or failure of the bonus scheme, not merely the end result. The depiction involves the use of a dynamic display as with the preferred embodiment. The depiction likewise could be a video clip from a motion picture, a dynamic computer generated or simulated image, an animation or any combination thereof.

Bonus Scheme Sequence

Figure 5:
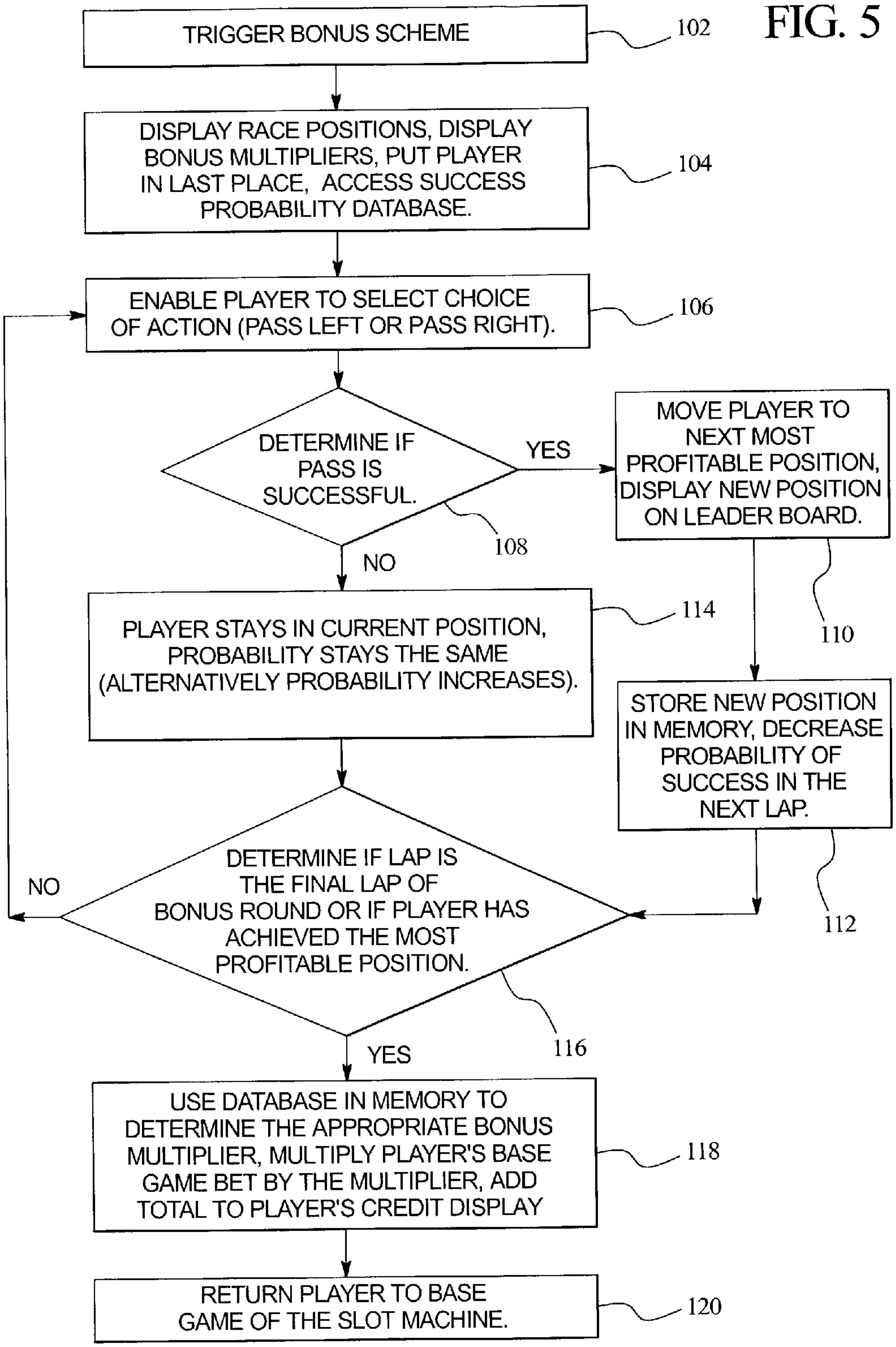
FIG. 5 is a flow diagram of one embodiment of the bonus scheme of the present invention.

FIG. 5 is a flowchart showing the sequence of operation for the above described bonus scheme. When a player achieves a bonus triggering or qualifying condition while playing the game, such as when the reels 30 of the display window 28 show "BONUS!," "BONUS!," "BONUS!," the gaming device 10 automatically begins the bonus round of the present invention as indicated by block 102. To enhance player excitement and enjoyment, the game preferably provides an initialization sequence with suitable audio and visual signals to inform the player that the combination of the reels 30 has invoked the bonus scheme. For example, the game could maintain a blank video monitor 32 until the bonus round begins, wherein the monitor flashes suitable video signals before presenting the initial bonus round screen.

The preferred initialization of the bonus round is indicated by block 104. The game displays the number of positions 54 and the bonus multipliers 60 to the player, and places the player in the last position (i.e., 1×multiplier) as indicated by block 104. The game accesses a success probability database from the memory device but preferably does not display the database to the player. The game enables the player to select a choice of action as indicated by block 106. The initial screen (FIG. 3) preferably provides a directional indicator 72 that prompts the player to select either the action activator 66 (pass left) or the alternative action activator 68 (pass right).

After the player selects an action, the game invokes the probability database from the memory device 38, and randomly determines if the player's choice of action succeeds in advancing the player to the next most valuable position, as indicated by diamond 108. To enhance player excitement and enjoyment, the game displays the determination to the player through a dynamic video, computer generated, animated or combined audio-visual sequence (FIG. 4) in accordance with the game theme. In the preferred embodiment, the game displays one lap of an automobile race wherein the player either passes the preceding car or gets "cut-off." The present invention contemplates other ways to display failure such as showing the player/driver's attempt ending in a fiery crash.

If the player successfully passes the preceding car as determined in diamond 108, the player moves to the next most valuable position 54 of the leader board 52 (FIG. 3), as indicated by block 110. The computer stores the new current position and obtains the next (decreasing) probability of advancement from the memory device 38 of the computer, as indicated by block 112. If the player does not successfully pass the preceding car as randomly determined in diamond 108, the player stays in the same position 54 of the leader board 52, and the probability of success preferably remains the same or is alternatively increased, as indicated by block 114.

At the end of the lap as indicated by diamond 116, the scheme determines if another lap (i.e., chance at advancement) exists or if the player has exhausted all the chances. The game also determines if the player has reached the most valuable position 54. If neither condition exists, the game enables the player to select another choice of action as indicated by block 106. If either condition exists as indicated in block 118, the game invokes the bonus multiplier database from the memory device 38, multiplies the player's current bet shown in the bet display 22 by the bonus multiplier corresponding to the position 54 the player achieves and displays the new total in the credit display 16. The game ends the bonus round and returns the player to the base game of gaming device 10 as indicated by block 120.

Figure 6:
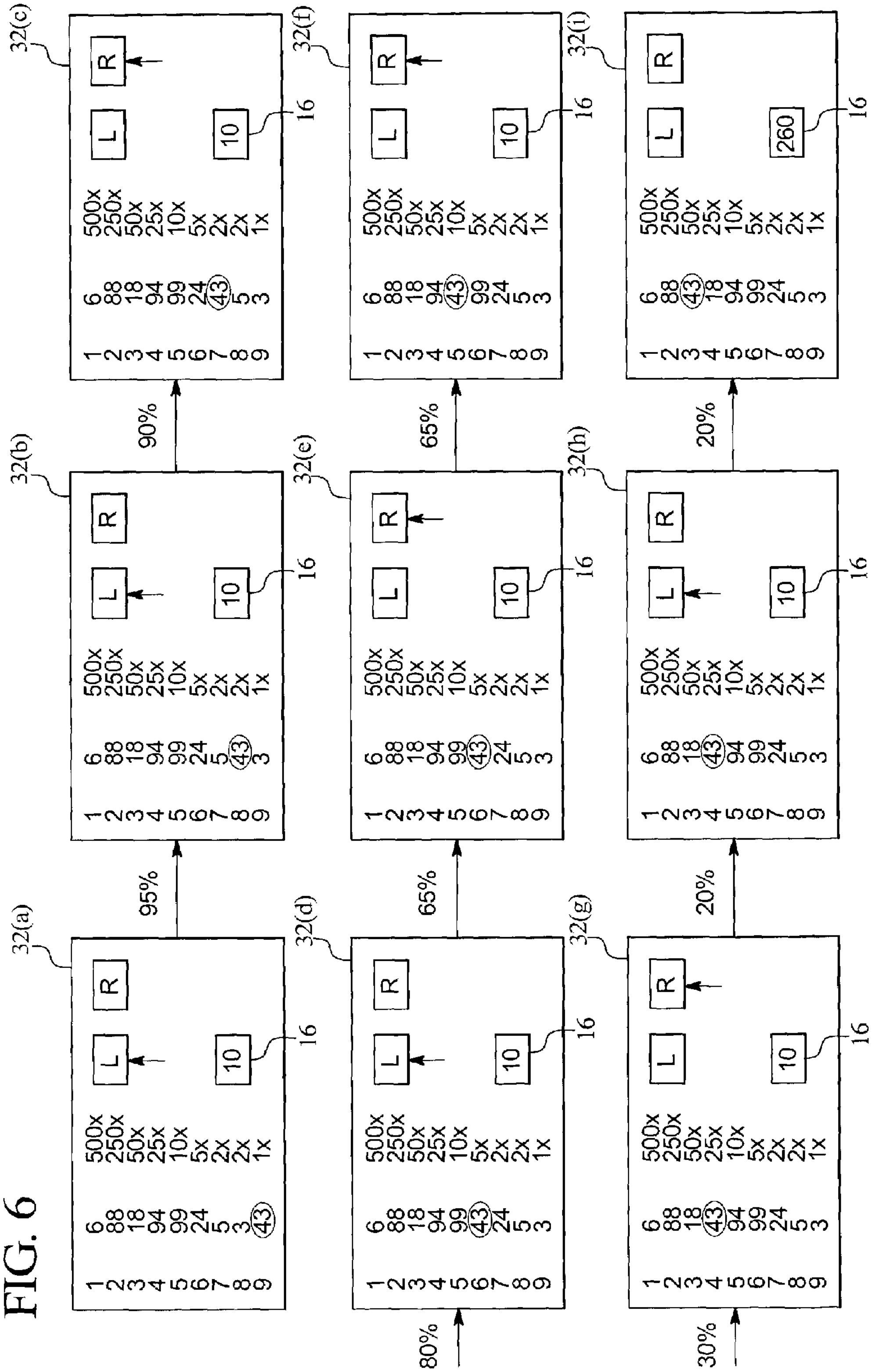
FIG. 6 is an illustration of one example of the present invention showing nine different points in time of the present bonus scheme.

FIG. 6 illustrates one example of the present invention. It shows nine separate screens 32(*a*) through 32(*i*) that illustrate the player's initial position, the player's choice of action (pass left or pass right), and the result of each choice of action at the end of the lap. The screens also show the credit display 16. For illustration purposes only, the probability of advancement is placed in between two consecutive screens as an example of a probability that the implementor would likely use for that particular chance for advancement.

Referring to screen 32(*a*) of FIG. 6, the player in car 43 begins the bonus round in last place and with 10 base game credits. The player chooses to pass car 3 on the left, the database in the memory 38 maintains a 95% probability that the player will randomly advance from the ninth position to the eighth and overtake the competitor. Screen 32(*b*) shows that the player passed car 3 and now chooses to pass car 5 on the left. The database maintains a 90% probability that the player will randomly advance from the eighth position to the seventh and overtake the competitor, car 5. Screen 32(*c*) shows that the player passed car 5 and now chooses to pass car 24 on the right. The database maintains an 80% probability that the player will randomly advance from the seventh position to the sixth and overtake the competitor, car 24. Screen 32(*d*) shows that the player passed car 24 and now chooses to pass car 99 on the left. The database maintains a 65% probability that the player will randomly advance from the sixth position to the fifth and overtake the competitor, car 99.

Screen 32(*e*) shows that the player failed to pass car 99 and now chooses to again pass car 99, this time on the right. The database still maintains the 65% probability that the player will randomly advance from the sixth position to the fifth and overtake the competitor, car 99. Screen 32(*f*) shows that the player passed car 99 and now chooses to pass car 94 on the right. The database maintains a 30% probability that the player will randomly advance from the fifth position to the fourth and overtake the competitor, car 94. Screen 32(*g*) shows that the player passed car 94 and now chooses to pass car 18 on the right. The database maintains a 20% probability that the player will randomly advance from the fourth position to the third and overtake the competitor, car 18.

Screen 32(*h*) shows that the player failed to pass car 18 and now chooses to again pass car 18, this time on the left. The database still maintains the 20% probability that the player will randomly advance from the fourth position to the third and overtake the competitor, car 18. Screen 32(*i*) shows that the player passed car 18. Screen 32(*i*) also shows the final position of the player after eight laps, the limit set by gaming device 10. The memory device 38 stores a bonus multiplier of 50× for the third position. The processor 36 of the computer multiplies the 50×multiplier by the player's bet of five base game credits in display 22 and displays the new total, 260 credits (250 from bonus plus the 10 original), in the credit display 16 of screen 32(*i*). The game returns the player to the base game.

It should be appreciated that an alternative embodiment could employ a button or other suitable input device that would enable the player to end the round before exhausting all chances for advancement or reaching the most valuable position. The preferred embodiment does not contain such an option.

Figure 7:
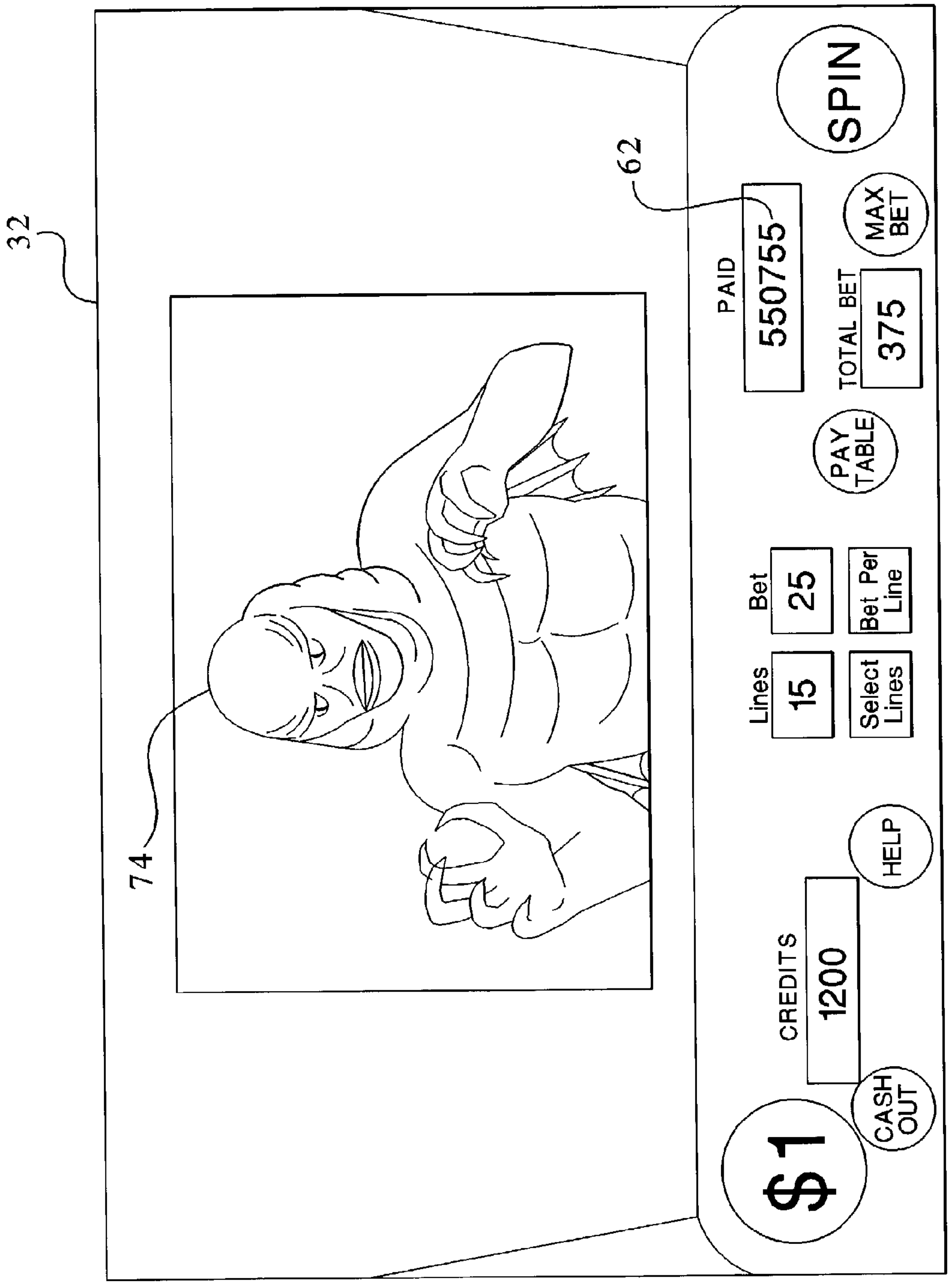
FIG. 7 is an illustration of a single screen from one dynamic video display illustrating the responsive video clip embodiment of the present invention.
Figure 8:
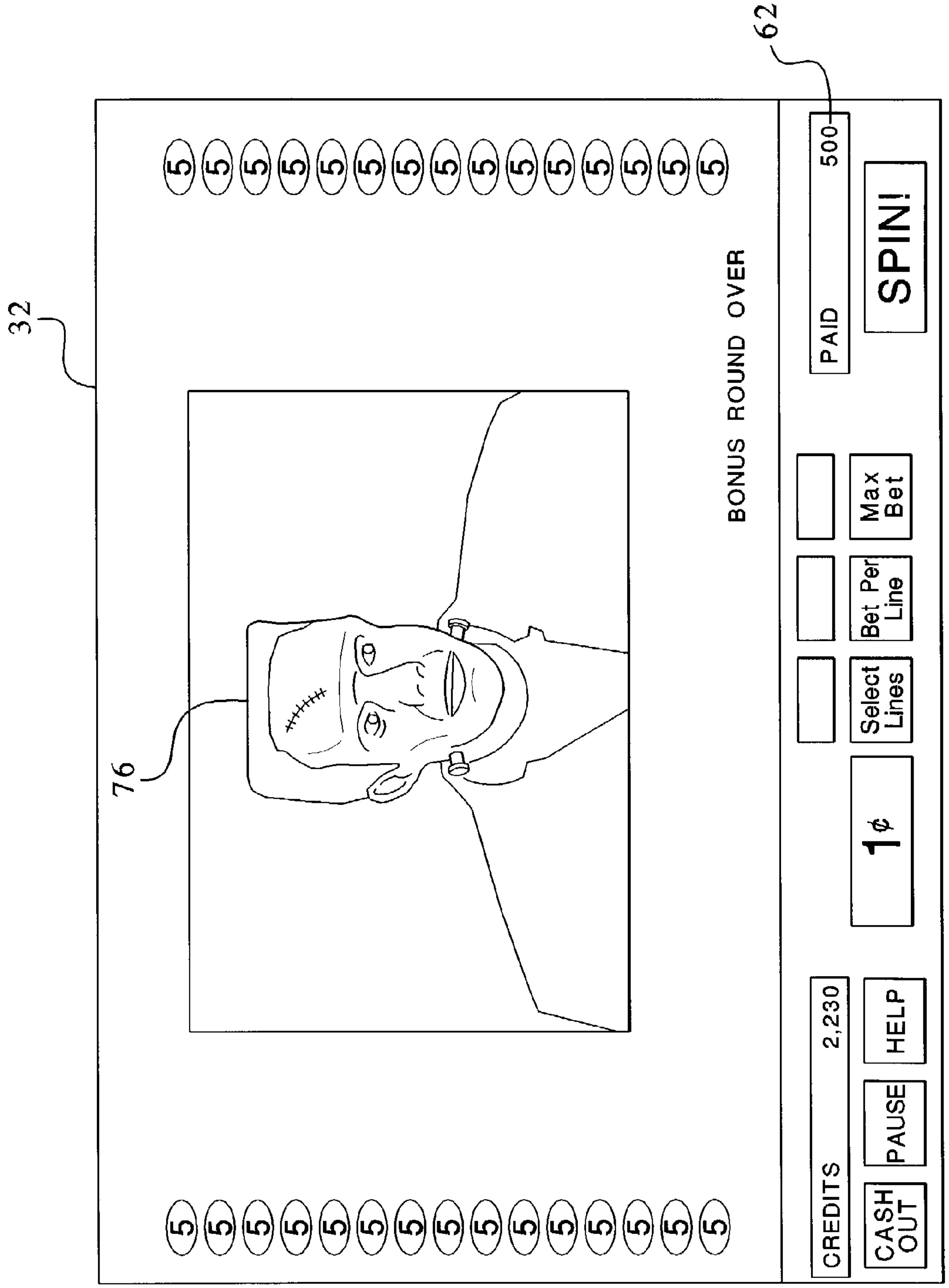
FIG. 8 is a single screen from another dynamic video display illustrating the responsive video clip embodiment of the present invention.

Referring to FIGS. 4, 7 and 8, an alternative embodiment of the present invention is shown wherein the game can provide dynamic audio-visual displays, and in particular video clips from motion pictures, in response to various predetermined events in the base game and bonus round of the gaming device. As discussed previously, FIG. 4, having the display of a dynamic video, computer generated, animated or combined audio-visual demonstration, displays whether the player advances in the bonus round. The game shows the display of FIG. 4 in response to a choice of an action activator or an alternative action activator, i.e., a selection in the bonus round.

FIG. 7 illustrates a dynamic display that occurs upon a different event; namely, upon the player's generation of an award in an amount sufficient to trigger the display. In this example, the dynamic display is a video clip from a popular television show. The present invention preferably provides responsive video clips, however, the game could also provide responsive computer simulations, animations or any combination thereof. FIG. 7 contains the video monitor 32, the video clip 74 and the paid display 62 showing that the player received a large bonus award. It should be appreciated that both a base game and a bonus award can trigger the video clip of the present invention.

The video clip 74 celebrates the player's achievement of a substantial award. The game preferably does not provide a video clip for any award but only for awards above a set value. Alternatively, the game could provide a clip anytime the player achieved an award. The video clips 74 are preferably short in length, approximately 2 to 10 seconds and preferably contain suitable audio displays. The audio displays may be edited over the original sound of the movie or television show. For example, the audio of the video clip 74 of FIG. 7 can contain the actual music from the television show, with a separate voice superimposed or dubbed in, wherein the voice makes an entertaining or funny remark about the video clip displayed. The implementor can provide any combination of original and edited audio displays.

Referring now to FIG. 8, a video clip 76 of another popular television show is shown in response to another triggering event; namely, the termination of the bonus round. The present invention contemplates providing a video clip in response to the initialization or termination of a bonus round. That is, upon a bonus round triggering event, the game begins the bonus round, preferably on the video monitor 32, by showing a video clip such as video clip 76. FIG. 8 illustrates a video clip displayed upon the termination of the bonus round, wherein the paid display 62 shows bonus round credits that the game has issued to a player. The video clips initiated upon a bonus initiation or termination preferably operate the same as described above. The game can also provide suitable simulated, animated or combined dynamic displays instead of a video clip.

Figure 9A:
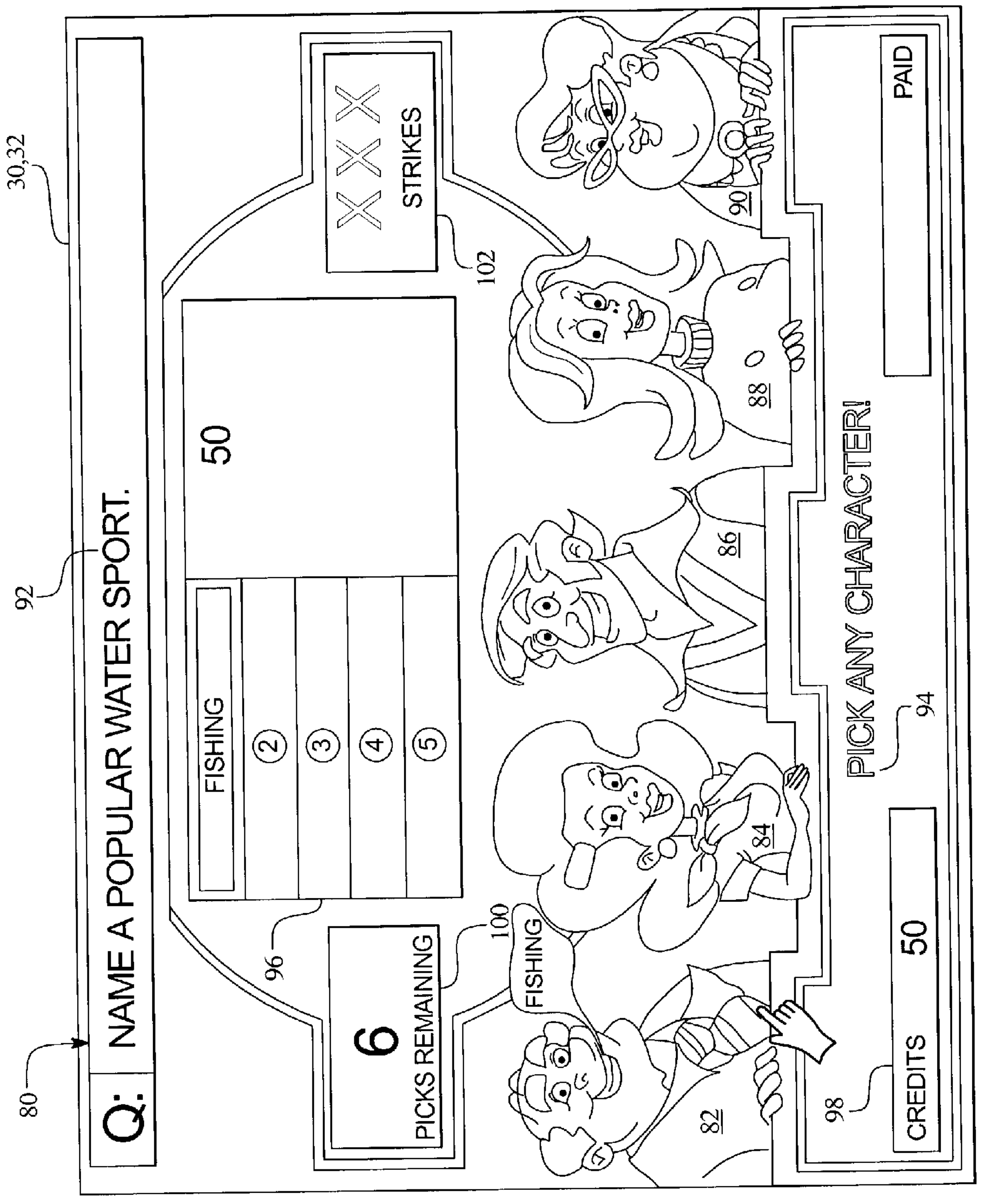
FIGS. 9A and 9B are elevation views of the screen of the present invention illustrating an embodiment, wherein the player can receive any of a pool of awards, but wherein the player's probability of success decreases after a selection resulting in a successful outcome.
Figure 9B:
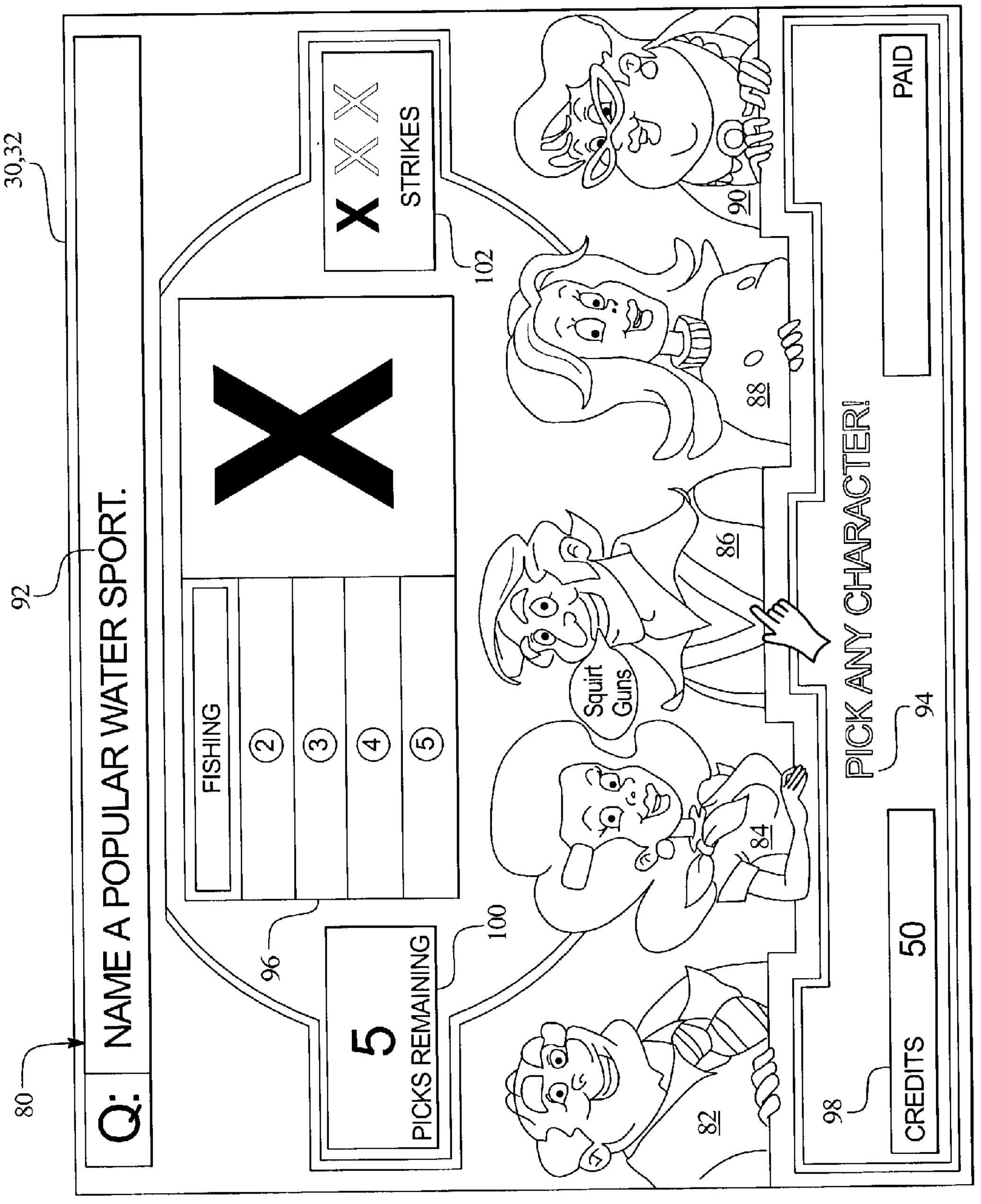

Referring now to FIGS. 9A to 9B, an alternative embodiment of the present invention is illustrated by the game 80. The game 80 is played in an embodiment on one of the display devices 30 or 32 discussed above. Game 80 differs from the previous embodiments in that game 80 stores in the memory device 38 a group or pool of a plurality of awards. The awards are randomly generated when the player obtains a successful outcome as opposed to being associated with the levels or positions 54 as discussed above. That is, the first time the player achieves a successful outcome, the player can win the highest award, the second highest award, of any of the other awards. The player does not build towards the highest award as discussed with respect to the above embodiments. The game 80, as above, decreases the probability of the player obtaining a successful outcome in a subsequent attempt when the player obtains a successful outcome in a current attempt. The game 80 of gaming device 10 in one embodiment provides the same probability of success in a subsequent attempt when the player is unsuccessful in the current attempt. In an alternative embodiment, gaming device 10 in game 80 raises the probability of success in a subsequent attempt when the player is unsuccessful in the current attempt. FIGS. 9A to 9B illustrate one possible embodiment for operating the game 80 of gaming device 10.

Game 80 uses the display device 30 or 32 in conjunction with the touch screen 46 and associated touch screen controller 48. Via touch screen 46, game 80 presents to the player a plurality of player selectable inputs or selections 82 to 90. That is, the player picks or touches one of the illustrated characters to select that character for play. The memory device 38 and processor 36 in cooperation with game 80 stores and uses a pool of a plurality of awards. For purposes of this illustration, the memory device 38 and processor 36 store five awards. The awards can, for example, be ten, twenty, thirty, forty and fifty credits. The awards are maintained in the pool and are selected randomly after the player selects one of the input devices 82 to 90 that results in a successful outcome. In another embodiment, the gaming device 10 according to the game 80 can randomly determine the outcomes prior to the player picking any of the selectable inputs 82 to 90. Either way the outcomes are randomly generated in this embodiment.

The game 80 begins with a question 92, which for example can be "name a popular water sport". Game 80 also provides a message 94 to the player to pick any of the characters. The player selects one of the characters, i.e., one of the inputs or selections 82 to 90. In FIG. 9A, the player selects the character 82. Character 82 then answers the question with the response, "fishing". The game 80 of gaming device 10 then displays on a board 96 that the selection of the input 82 yielded a successful outcome. Indeed, the successful outcome of fishing provided by the input 82 yields the highest award of fifty. Game 80 awards the player fifty credits as shown in credit meter 98.

The game 80 includes a picks remaining indicator 100. Game 80 provides, for example, seven total picks, wherein the player's selection of the input 82 reduces the picks remaining to six as illustrated in the meter 100 of FIG. 9A.

In one embodiment, game 80 provides a 100% chance that the player obtains a successful outcome from the first selection. That is, the pool of possible outcomes in an embodiment includes only successful outcomes or awards in the first pick. As game 80 proceeds, the pool of possible outcomes has an increasing amount of non-successful outcomes, referred to herein as strikes. In one preferred embodiment, gaming device 10 replaces each award or successful outcome with a non-successful or strike outcome. Therefore, after the game play illustrated in FIG. 9A, game 80 of gaming device 10 replaces the award fifty with a strike outcome. Thus, the award fifty, i.e., the highest award, is no longer available. It should be appreciated however that the player obtained the highest award after the first selection rather than proceeding from position to position as described above. Further, the player has already received an incremental award, wherein the previous embodiments described a game in which the processor 36 provided a single award to the player at the end of the game, depending upon the player's ultimate position.

The probabilities in one preferred embodiment decrease as a function of the equation $(x-n)/x$, wherein x is the total number of awards in the award group or award pool and n is the number of previous successful outcomes. After the display of game 80 in FIG. 9A, then the probability of obtaining another successful outcome is five minus one, or four, divided by five, which yields eighty percent. The other twenty percent is consumed by the single strike or non-successful outcome. If in the subsequent attempt, the player selects a non-successful outcome, the equation of $(x-n)/x$ yields the same probability as the previous attempt because the value of n remains the same and does not increase. In previous embodiments, when the player does not achieve a successful outcome, the player retains the same probability or odds of obtaining a positive outcome with the subsequent selection. The picks remaining indicator 100, however, illustrates that the player only has a certain number of picks to make. When the total number of picks has been made, game 80 ends.

Referring now to FIG. 9B, a non-successful outcome counter or strike meter 102 illustrates another possible way to end the game. The game 80 of gaming device 10 provides the same question 92 of "name a popular water sport". When the player selects the input 86 in FIG. 9B, the game 80 of gaming device 10 provides an audio, visual or audio-visual output of "squirt guns", which corresponds to a non-successful outcome as illustrated in the board 96 by the strike or X. Game 80 posts the strike or X in the strike meter 102. Strike meter 102 in the illustrated embodiment provides three possible non-successful outcomes or strikes, although any practical number may be provided. When the player obtains three strikes, game 80 ends.

The game 80 in one embodiment provides a finite number of awards. In the illustrated embodiment, the game 80 provides five possible awards as illustrated by board 96. If the processor 36 randomly generates five successful outcomes before the picks indicated by the picks indicator 100 and before the strikes indicated by the strike meter 102 become depleted or reach the limit, respectively, game 80 ends. Game 80, therefore, ends upon the occurrence of the first of obtaining all of the awards, using all of the picks or obtaining three strikes. When the equation $(x-n)/x$ is used, the player's choices of success drop to zero when $x=n$, i.e., when the player has achieved as many successful outcomes as there are awards.

In one alternative embodiment, the game 80 can include a larger number of awards than there are picks, wherein the game 80 ends either upon the player using all the possible picks or obtaining the limit of the strikes. In a further alternative embodiment, the award pool can initially include a number of strikes, so that there is a possibility that the player will not obtain a successful outcome upon the initial selection. Here, game 80 would not follow, exactly, the equation $(x-n)/x$. Any suitable percentage could be used as defined by the game implementor.

When the player picks the input 86 and receives the unsuccessful "squirt gun" outcome, gaming device 10 illustrates the strike in the strike meter 102 and continues to illustrate that the player has to this point fifty credits in the credit meter 98. Gaming device 10 continues to display the "pick any character" message 94 because the picks remaining meter 100 indicates that the player still has five picks remaining. In an embodiment, gaming device 10 enables the player to reselect previously selected inputs. For example, the player could again pick the input 82 or the input 86. In another embodiment, gaming device 10 in game 80 only allows the player to select each input one time. In the illustrated embodiment, because the initial number of picks, seven, is greater than the displayed number of characters 82 to 90, game 80 enables the player to select a character multiple times.

Upon the player's next selection, gaming device 10 in game 80 uses the equation of $(x-n)/x$ to calculate that because there are five total awards and the player has currently obtained one successful outcome, the player retains an eighty percent chance of obtaining a successful outcome and randomly winning one of the remaining awards, i.e., ten, twenty, thirty and forty.

In an alternative embodiment, gaming device 10 does not have to use an equation to calculate the next successive probability of success. For example, gaming device 10 can alternatively select from a pool of possible percentages. For example, the processor 36 can: (i) select from the success probability range of ninety to one hundred percent for the pick after the first successful outcome; (ii) select from the range eighty to eighty-nine percent for the pick after the second successful outcome; (iii) select from the range of seventy to seventy-nine percent next, etc. In a preferred embodiment, after a successful outcome, the player has a smaller chance of obtaining another successful outcome. It should be appreciated, however, that gaming device 10 can increase or maintain the same probability of success after a non-successful outcome.

It should be appreciated that the present invention contemplates that using the same probability in a successful attempt (if the prior attempt was not successful) includes using approximately the same probability such that relatively minor or insignificant variations in the probabilities function as the same probability.

Figure 10:
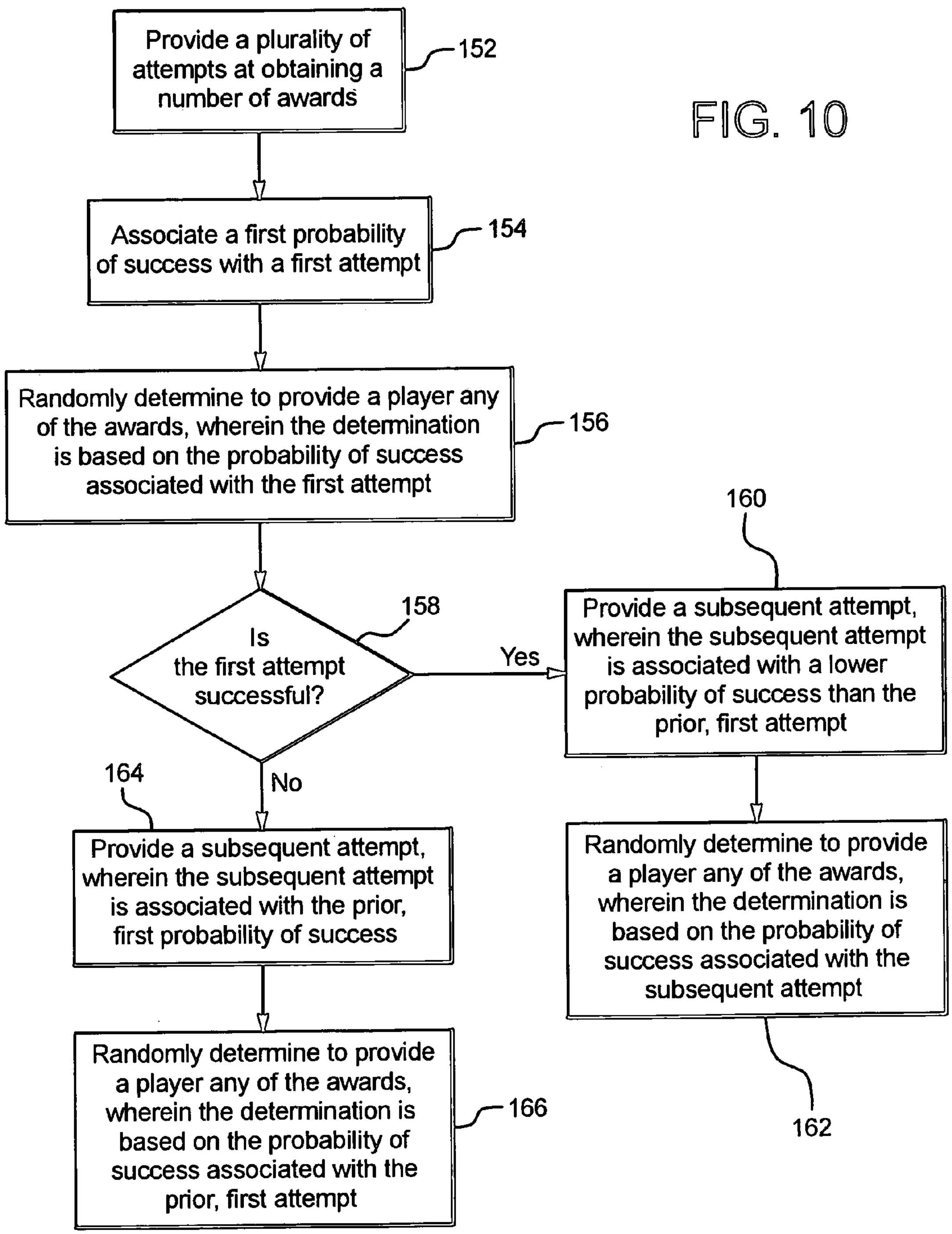
FIG. 10 is a flow diagram of one embodiment of the gaming device disclosed herein, wherein the player can receive any of a pool of awards, but wherein the player's probability of success decreases after a selection resulting in a successful outcome.

As illustrated in FIG. 10, in one alternative embodiment, the gaming device provides a plurality of attempts at obtaining a number of awards and associates a first probability of success with a first attempt as indicated in blocks 152 and 154. The gaming device randomly determines to provide a player any of the awards, wherein the determination is based on the probability of success associated with the first attempt as indicated in block 156. If the first attempt is successful, the gaming device provides a subsequent attempt and randomly determines to provide a player any of the awards, wherein the subsequent attempt is associated with a lower probability of success than the prior, first attempt and the determination is based on the probability of success associated with the subsequent attempt, as indicated in diamond 158 and blocks 160 and 162. If the first attempt is not successful, the gaming device provides a subsequent attempt and randomly determines to provide a player any of the awards, wherein the subsequent attempt is associated with the prior, first probability of success and the determination is based on the probability of success associated with the first attempt as indicated in diamond 158 and blocks 164 and 166.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of a processor, said gaming device comprising:

a game controlled by the processor; and a display device controlled by the processor and operable to display the game;

wherein said processor is programmed to provide:

a first attempt for obtaining any one of a group of awards, the first attempt having a first probability of obtaining one of the awards, said first probability being greater than zero; and a second attempt for obtaining any of the remaining awards from the group, wherein (a) the second attempt has the first probability of obtaining one of the awards if the first attempt does not successfully obtain one of the awards, and (b) the second attempt has a second probability of obtaining one of the awards if the first attempt successfully obtains one of the awards, wherein said second probability of obtaining one of the awards is different than the first probability of obtaining one of the awards.

2. The gaming device of claim 1, wherein the awards are randomly generated when one of the attempts successfully obtains one of the awards.

3. The gaming device of claim 1, wherein the second probability is lower than the first probability.

4. The gaming device of claim 3, wherein the awards are randomly generated when one of the attempts successfully obtains one of the awards.

5. The gaming device of claim 1, which includes a plurality of player selectable inputs, the selection of each of which initiate a determination of whether one of the awards is successfully obtained.

6. The gaming device of claim 1, which includes a plurality of player selectable inputs, wherein a successful outcome or a non successful outcome is associated with each selection prior to enabling the player to pick the selections.

7. The gaming device of claim 1, wherein the first probability is one hundred percent.

8. The gaming device of claim 1, wherein the second probability is related to the total number of awards in the award group.

9. The gaming device of claim 1, which includes X number of awards in the award group, wherein X is greater than one and wherein the second probability is equal to ((X−1)/X).

10. The gaming device of claim 1, which includes a third attempt for obtaining any of the remaining awards provided if the first and second attempts each successfully obtain one of the awards, the third attempt having a third probability of obtaining one of the awards.

11. The gaming device of claim 10, wherein the third probability is less than the second probability.

12. The gaming device of claim 10, wherein the third probability is based on the number of awards in the award group.

13. The gaming device of claim 10, which includes X number of awards in the award group, wherein X is greater than two and wherein the third probability is equal to ((X−2)/X).

14. The gaming device of claim 1, which includes a third attempt for obtaining one of the awards if the first and second attempts do not successfully obtain the one of the award, the third attempt having the first probability of obtaining one of the awards.

15. The gaming device of claim 1, which includes a third attempt for obtaining a remaining one of the awards provided only if one of the first and second attempts successfully obtains one of the awards, the third attempt having at least the second probability of obtaining one of the awards.

16. The gaming device of claim 15, wherein the second probability is based on the number of awards in the award group.

17. The gaming device of claim 15, which includes X number of awards in the award group, wherein X is greater than two and wherein the second probability is equal to ((X−1)/X).

18. A gaming device operable under control of a processor, said gaming device comprising:

a game controlled by the processor; and a display device controlled by the processor and operable to display the game;

wherein said processor is programmed to provide:

a first attempt for obtaining an award selected from a group of X number of awards, where X is greater than two, said first attempt having a probability of success greater than zero;

a second attempt at obtaining a second one of the awards, the second attempt having a probability of success equal to ((X−1)/X) if the first attempt is successful at obtaining one of the awards; and a third attempt at obtaining a third one of the awards, the third attempt having a probability of success equal to ((X−2)/X), if the first and second attempts are each successful at obtaining one of the awards.

19. The gaming device of claim 18, wherein at least one of the first, second and third awards are randomly generated from the group of awards when the first, second and third attempts, respectively, are successful.

20. The gaming device of claim 18, wherein the processor ends game play after a number of unsuccessful attempts.

21. The gaming device of claim 18, wherein the processor ends game play after X number of successful attempts.

22. The gaming device of claim 18, which includes a provided number of picks, wherein the processor ends game play after the player makes the provided number of picks.

23. The gaming device of claim 18, wherein the processor ends game play upon a first occurrence of X number of successful attempts, a number of unsuccessful attempts and a number of total player picks.

24. The gaming device of claim 18, wherein the first attempt has a probability of success and the second attempt has the same probability of success if the first attempt is unsuccessful at obtaining one of the awards.

25. The gaming device of claim 18, wherein the first attempt has a probability of success and the third attempt has at least the same probability of success if the first and second attempts are each unsuccessful at obtaining one of the awards.

26. The gaming device of claim 18, wherein the third attempt has a probability of success equal to ((X−1)/X) if only one of the first and second attempts is successful at obtaining one of the awards.

27. A gaming device operable under control of a processor, said gaming device comprising:

a game controlled by the processor; and a display device controlled by the processor and operable to display the game;

wherein said processor is programmed to provide:

a plurality of attempts at obtaining randomly generated awards for a plurality of awards; and a plurality of successive probabilities of success at obtaining the randomly generated awards, wherein the probabilities are provided according to a function of (x−n)/x, wherein x is a total number of awards and n is a number of prior successful outcomes obtained by a player and wherein a first of the probabilities of success is greater than zero.

28. A gaming device comprising:

a plurality of successive attempts at obtaining one of a plurality of randomly generated awards;

a plurality of successive probabilities of success of obtaining the randomly generated awards, wherein each of the plurality of successive probabilities of success is different and a first one of the probabilities of success is greater than zero; and a processor that randomly successively determines if the attempts are successful based on: a first one of the probabilities of success for a first of said attempts, the same probability of success with the next successive attempt if the previous attempt is not successful, and the next probability of success if the previous attempt is successful.

29. A gaming device comprising:

a display device;

a plurality of selections displayed by the display device;

a total number of picks of the selections provided to a player;

an area of the display device that displays and ranks awards provided upon the player picks of the selections; and a processor operable to randomly determine whether one of the players picks yields one of the awards for the player, when an award is provided to the player, decrease a probability greater than zero that a subsequent random determination based on a player pick of one of the selections yields another of the awards and when an award is not provided to the player, utilize a previously used probably that a subsequent random determination based on a player pick of one of the selections yields another of the awards.

30. The gaming device of claim 29, which includes an area of the display device that displays a tally when one of the player picks does not yield one of the awards for the player.

31. The gaming device of claim 29, wherein the game ends upon the first of: (i) a pick of the total number of picks; (ii) an accumulation of a number selections that do not yield an award; and (iii) an accumulation of all available awards.

32. A method of operating a gaming device comprising:

(a) providing a number of awards;

(b) providing a plurality of attempts at obtaining the awards;

(c) associating a probability of success with each attempt including (i) associating a lower probability with a subsequent attempt than a probability associated with a prior attempt when the prior attempt successfully obtains one of the awards, and (ii) associating the probability associated with a prior attempt with a subsequent attempt when the prior attempt does not successfully obtain one of the awards, wherein a first of the probabilities is greater than zero; and (d) randomly determining to provide a player any of the awards based on the probability associated with each attempt.

33. The method of claim 32, which includes associating the same probability with a subsequent attempt as the probability associated with a prior attempt when the prior attempt does not successfully obtain a higher one of the awards.

34. The method of claim 32, wherein steps (a) to (c) are provided via a data network.

35. The method of claim 34, wherein the data network is an internet.

* * * * *